United States Patent
Fronczak et al.

(12) 
(10) Patent No.: US 10,394,386 B1
(45) Date of Patent: Aug. 27, 2019

(54) INTERFERENCE DETECTION

(71) Applicant: Synaptics Incorporated, San Jose, CA (US)

(72) Inventors: Kevin Fronczak, Penfield, NY (US); Eric Bohannon, Henrietta, NY (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/996,217

(22) Filed: Jun. 1, 2018

(51) Int. Cl.
| | | |
|---|---|---|
| *G06F 3/041* | (2006.01) | |
| *G09G 3/36* | (2006.01) | |
| *G06K 9/00* | (2006.01) | |
| *G06F 3/044* | (2006.01) | |

(52) U.S. Cl.
CPC .......... *G06F 3/0418* (2013.01); *G06F 3/044* (2013.01); *G06K 9/0002* (2013.01); *G06F 2203/04108* (2013.01)

(58) Field of Classification Search
CPC ...... G06F 3/0418; G06F 3/046; H03K 17/962
See application file for complete search history.

(56) References Cited

U.S. PATENT DOCUMENTS

2012/0068966 A1* 3/2012 Washburn ............. G06F 3/0418 345/174
2015/0054754 A1* 2/2015 Han ..................... G06F 3/0418 345/173

* cited by examiner

*Primary Examiner* — Nelson M Rosario
(74) *Attorney, Agent, or Firm* — Ferguson Braswell Fraser Kubasta PC (57) ABSTRACT

An input device associated with a sensing region is disclosed. The input device includes: a sensor electrode configured to receive a resulting signal associated with the sensing region; a current conveyor configured to generate a first replica of the resulting signal; a mixer circuit configured to generate a differential current by demodulating the first replica of the resulting signal; an interference detection circuit (IDC) configured to: generate a second replica of the resulting signal based on the first replica; determine the second replica includes an interference signal based on a reference current; and generate an interference alert signal in response to determining the second replica includes the interference signal; and an auxiliary component configured to generate an output based on the differential current and the interference alert signal.

20 Claims, 6 Drawing Sheets

INTERFERENCE DETECTION

TECHNICAL FIELD

The described embodiments relate generally to electronic devices, and more specifically, to circuits for use in detecting and mitigating interference in a resulting signal received from a capacitive sensor electrode.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones). Proximity sensor devices may also be used to detect input objects (e.g., finger, styli, pens, fingerprints, etc.).

When a large interference signal is present, it is more likely that that position of an input object in the sensing region will be incorrectly determined and/or fingerprint sensing operations will result in incorrect matches. Accordingly, the architecture of the proximity sensor device should be designed to detect and mitigate interference signals.

SUMMARY

In general, in one aspect, embodiments relate to an input device associated with a sensing region. The input device comprises: a sensor electrode configured to receive a resulting signal associated with the sensing region; a current conveyor configured to generate a first replica of the resulting signal; a mixer circuit configured to generate a differential current by demodulating the first replica of the resulting signal; an interference detection circuit (IDC) configured to: generate a second replica of the resulting signal based on the first replica; determine the second replica comprises an interference signal based on a reference current; and generate an interference alert signal in response to determining the second replica comprises the interference signal; and an auxiliary component configured to generate an output based on the differential current and the interference alert signal.

In general, in one aspect, embodiments relates to a method for operating an input device associated with a sensing region. The method comprises: receiving, from a sensor electrode, a resulting signal associated with the sensing region; generating, by a current conveyor, a first replica of the resulting signal; generating, by a mixer circuit, a differential current by demodulating the first replica of the resulting signal; generating, by an interference detection circuit (IDC), a second replica of the resulting signal based on the first replica of the resulting signal; detecting, by the IDC, an interference signal in the second replica based on a reference current; generating, by the IDC, an interference alert signal in response to detecting an interference signal in the second replica; and generating, by an auxiliary component, an output based on the differential current and the interference alert signal.

In general, in one aspect, the invention relates to a processing system for an input device associated with a sensing region. The processing system comprises: sensor circuitry configured to: drive a transmitting signal on to a transmitter electrode associated with the sensing region; receive a resulting signal from a receiver electrode associated with the sensing region; generate a first replica of the resulting signal; generate a differential current by demodulating the first replica of the resulting signal; generate a second replica of the resulting signal based on the first replica of the resulting signal; detect an interference signal in the second replica based on a reference current; generate an interference alert signal in response to detecting an interference signal in the second replica; mitigate effects of the interference signal in the differential current based on the interference alert signal; and generate an output based on the differential current after mitigating effects of the interference signal; and determination circuitry configured to: determine a presence of an input object in the sensing region based, at least in part, on the output.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
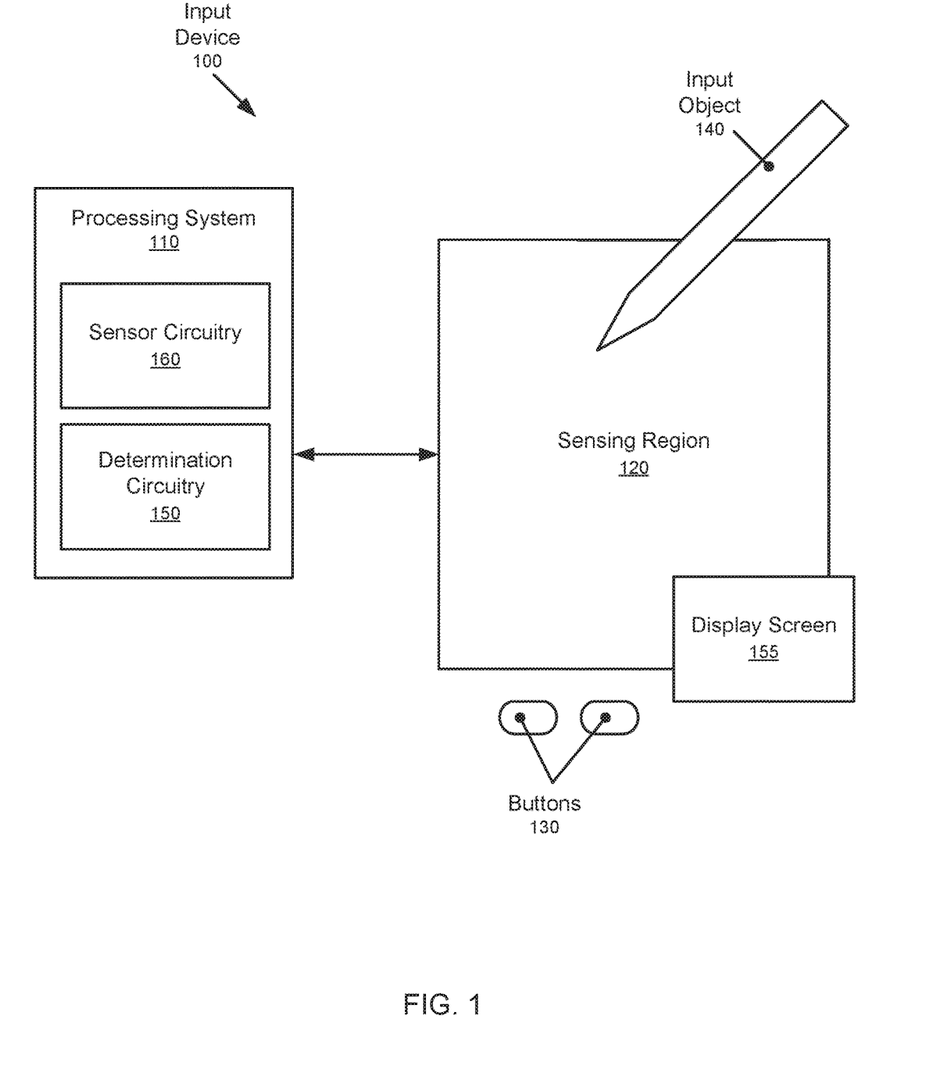
FIG. 1 and FIG. 2 show block diagrams of an input device in accordance with one or more embodiments.

Various embodiments disclose input devices and methods that facilitate improved usability. Specifically, one or more embodiments disclose circuits and techniques for detecting and/or mitigating an interference signal. By detecting and/or mitigating the interference signal, it is less likely that that position of an input object in the sensing region will be incorrectly determined and/or fingerprint sensing operations will result in incorrect matches Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) extends from a surface of the input device (100) in one or more directions into space, for example, until a signal-to-noise ratio falls below a threshold suitable for object detection. For example, the distance to which this sensing region (120) extends in a particular direction, in various embodiments, may be on the order of less than a millimeter, millimeters, centimeters, or more, and may vary with the type of sensing technology used and/or the accuracy desired. In some embodiments, the sensing region (120) detects inputs involving no physical contact with any surfaces of the input device (100), contact with an input surface (e.g. a touch surface) of the input device (100), contact with an input surface of the input device (100) coupled with some amount of applied force or pressure, and/or a combination thereof.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques. The input device (100) may also include one or more buttons (130) to collect user input.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or mutual capacitance (also referred to as "transcapacitance"). Absolute capacitance sensing methods detect changes in the capacitive coupling between sensor electrodes and an input object. Transcapacitance sending methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). The resulting signal received by a receiver electrode may be affected by environmental interference (e.g., other electromagnetic signals) as well as input objects in contact with, or in close proximity to, the sensor electrodes.

The processing system (110) may be configured to operate the hardware of the input device (100) to detect input in the sensing region (120). The processing system (110) may include parts of, or all of, one or more integrated circuits (ICs) and/or other circuitry components. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may be implemented in hardware, firmware, software, or a combination thereof. In some embodiments, the processing system (110) may include determination circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only determination circuitry (150) and sensor circuitry (160), alternative or additional modules may exist in accordance with one or more embodiments of the disclosure. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region. Each sensing element may have a corresponding individual value in the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While many embodiments are described in the context of a fully-functioning apparatus, the mechanisms of the disclosure are capable of being distributed as a program product (e.g., software) in a variety of forms. For example, the mechanisms of the disclosure may be implemented and distributed as a software program on information-bearing media that are readable by electronic processors (e.g., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Figure 2:
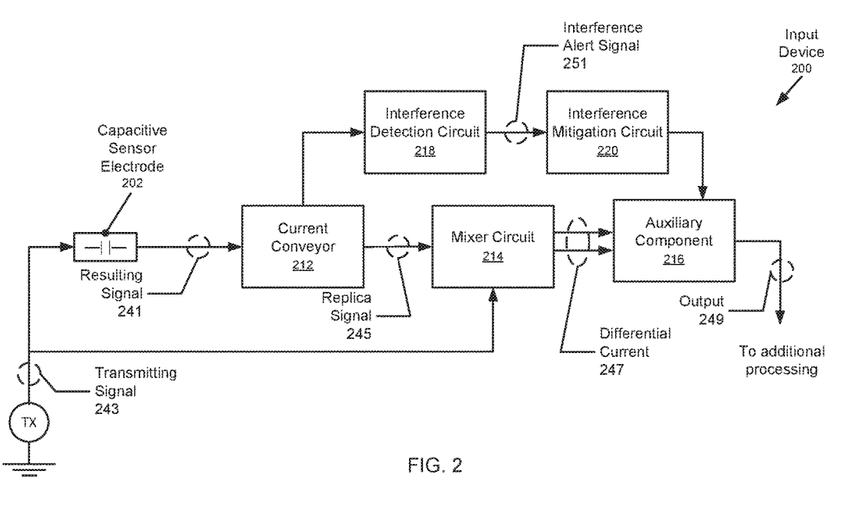

FIG. 2 shows an input device (200) in accordance with one or more embodiments. The input device (200) may correspond to input device (100), discussed above in reference to FIG. 1. As shown in FIG. 2, the input device (200) includes a current conveyor (212), a mixer circuit (214), an auxiliary component (216), an interference detection circuit (218), and an interference mitigation circuit (220). The current conveyor (212) is coupled to at least one capacitive sensor electrode (202) associated with the sensing region (120), discussed above in reference to FIG. 1. Moreover, one or more of these components (212, 214, 216, 218, 220) may be part of the processing system (110) (e.g., sensor circuitry (160), determination circuitry (150)), discussed above in referenced to FIG. 1.

As shown in FIG. 2, the input to the current conveyor (212) includes a resulting signal (241) associated with the capacitive sensor electrode (202). The resulting signal may be a function of one or more of: (i) a transmitter signal (243) that drives the capacitive sensor electrode (202); (ii) user input (e.g., finger, stylus, etc.) if any, in the sensing region (120); and (iii) interference, if any, from one or more sources.

In one or more embodiments, the current conveyor (212) is configured to generate and output a replica (245) of the resulting signal (241). The replica (245) may be an exact copy of the resulting signal (241) or may be an approximation of the resulting signal (241). The replica (245) might or might not have the same polarity of the resulting signal (241). The current conveyor (212) may generate the replica (245) using one or more current mirrors composed of one or more transistors (e.g., PMOS transistors, NMOS transistors, etc.). The input impedance of the current conveyor (212) and the output impedance of the current conveyor are likely to be different. Moreover, the output impedance of the current conveyor is likely to be very high.

In one or more embodiments, the mixer circuit (214) is configured to generate a differential current (247) based on the replica signal (245). Specifically, the differential current (247) is the result of the mixer circuit (214) demodulating (e.g., down-converting) the replica signal (245). Demodulating effectively shifts the high-frequency content in the replica signal (245) down to a DC level. Accordingly, the differential current (247) includes information (e.g., user input in the sensing region) at the fundamental frequency and possibly noise/interference and information present at odd harmonics as well. In one or more embodiments, the differential current is only pseudo-differential. In such embodiments, at any given time, there is only a pulse on one of the two lines that form the differential current. In one or more embodiments, the mixer circuit (218) is implemented using a switch array.

In one or more embodiments, the input device (200) includes an auxiliary component (216). The auxiliary component (230) is driven by the differential current (247). For example, the auxiliary component may include an analog to digital converter (ADC). The ADC is configured to generate a digital output based on the differential current (247). The ADC may be a delta-sigma modulator that encodes the differential current (247) into the digital output (249). The ADC may also be a successive approximation ADC (SAR-ADC) or a pipelined ADC. Additionally or alternatively, the auxiliary component (230) may be an analog filter or a digital filter (e.g., decimation filter). The output (249) of the auxiliary component (230), either by itself or following additional processing, may be used to determine the presence of an input object in the sensing region (100). Additionally or alternatively, the output (249) may be used to perform fingerprint sensing.

In one or more embodiments, the input device (200) includes an interference detection circuit (218). The interference detection circuit (218) is configured to generate an additional replica (not shown) of the resulting signal (247) and detect the presence of an interference signal in the additional replica based on a reference current (discussed below). The additional replica is generated based on the replica (245) generated by the current conveyor (212). Moreover, the additional replica is generated as to not impact operation of the current conveyor (212). In one or more embodiments, the interference detection circuit (218) generates an interference alert signal (251) in response to detecting the presence of an interference signal in the additional replica.

Those skilled in the art, having the benefit of this detailed description, will appreciate that if an interference signal is detected in the additional replica, the interference signal and/or the effects of the interference signal will also be present in the replica (245) generated by the current conveyor (212) and the differential current (247) generated by the mixer circuit (214).

In one or more embodiments, the input device (200) includes the interference mitigation circuit (220). Although FIG. 2 shows the interference mitigation circuit (220) being separate from the auxiliary component (216), in other embodiments, the interference mitigation circuit (220) is integrated with the auxiliary component (216). The interference mitigation circuit (220) is configured to mitigate (e.g., offset, reduce, cancel, etc.) the effects of the interference signal on the differential current (247) and thus improve the quality of the output (249) from auxiliary component (216) (discussed below). The interference mitigation circuit (220) may be triggered by the interference alert signal (251).

Those skilled in the art, having the benefit of this detailed description, will appreciate that by improving the output (249), it is less likely that incorrect determinations regarding the presence and/or position of an input object in the sensing region will occur and/or incorrect determinations associated with fingerprint sensing (e.g., false matching) will occur.

Although FIG. 2 only shows a single capacitive sensor electrode (202), a single current conveyor (212), and a single mixer circuit (214), in one or more embodiments, the input device (200) may have any number of capacitive sensor electrodes coupled to any number of current conveyors and mixer circuits.

Further, although FIG. 2 shows the interference detection circuit (218) and the interference mitigation circuit (220) as being separate, in one or more embodiments, the interference detection circuit (218) and the interference mitigation circuit (220) are integrated.

Figure 3:
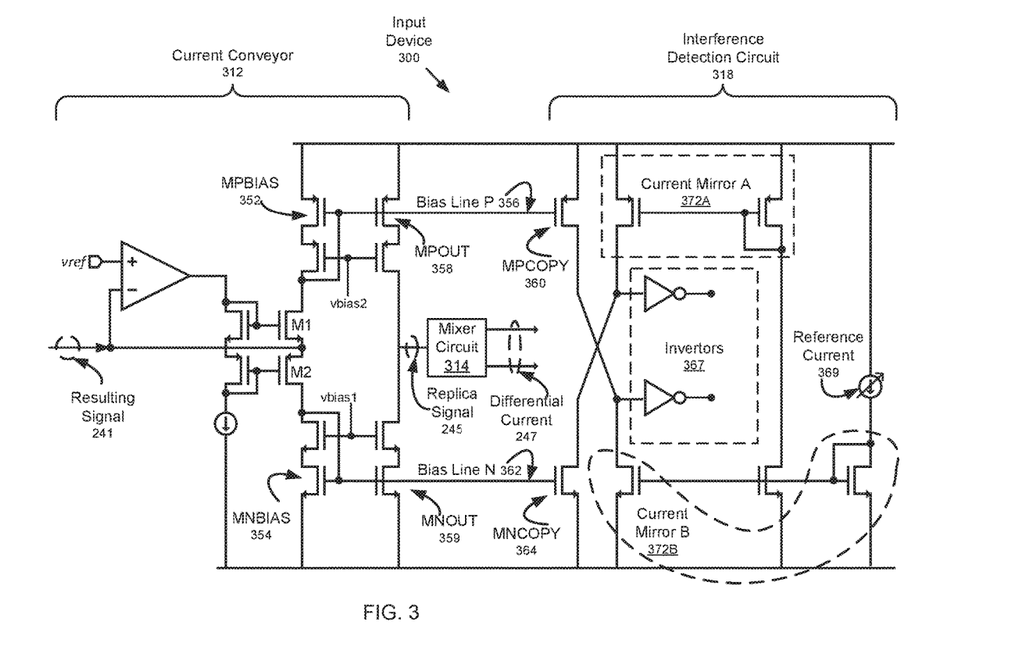
FIG. 3 show circuit diagrams of a current conveyor and an interference detection circuit in accordance with one or more embodiments.

FIG. 3 shows an input device (300) in accordance with one or more embodiments. The input device (300) may correspond to input device (200), discussed above in reference to FIG. 2. As shown in FIG. 3, the input device (300) includes a current conveyor (312), a mixer circuit (314), and an interference detection circuit (318). The current conveyor (312), the mixer circuit (314), and the interference detection circuit (318) may correspond to the current conveyor (212), the mixer circuit (214), and the interference detection circuit (218), discussed above in reference to FIG. 2.

In one or more embodiments, the input device (300) includes the current conveyor (312). As shown in FIG. 3 and discussed above, the current conveyor (312) generates the replica signal (245) of the resulting signal (241) using multiple transistors (e.g., M1, M2, MPBIAS (352), MNBIAS (354), MPOUT (358), MNOUT (359)).

In one or more embodiment, the input device (300) includes the interference detection circuit (318). The interference detection circuit (318) includes multiple transistors (e.g., MPCOPY (360), MNCOPY (364)), multiple current mirrors (e.g., current mirror A (372A), current mirror B (372B)), one or more inverters (367), and a reference current ($I_{REF}$) (369). The output of one or both of the inverters (367) may correspond to the interference alert signal (251). In one or more embodiments, when determining a frequency of the interference signal is not required, the inverters (367) may be implemented as Schmitt triggers to prevent rapid toggling near the inverter transition point.

As shown in FIG. 3, the interference detection circuit (318) utilizes the bias lines (e.g., Bias Line P (356), Bias Line N (362)) of the current conveyor (312) to couple the gates of MPCOPY (360) and MNCOPY (364) to the gates of MPOUT (358) and MNOUT (359), respectively. Further, the drain of MPCOPY (360) is coupled to (e.g., feeds into) at least one of the inverters (367) and current mirror B (372B). Current mirror B (372B) and MPCOPY (360) are opposite types (i.e., NMOS vs. PMOS). Similarly, the drain of MNCOPY (364) is coupled to (e.g., feeds into) at least one of the inverters (367) and current mirror A (372A). Current mirror A (372A) and MNCOPY (364) are opposite types (PMOS vs. NMOS). Both current mirror A (372A) and current mirror B (372B) mirror currents associated with the reference current (369).

In one or more embodiments, during normal operation when little to no interference is present, the resulting signal (241) enters the current conveyor (312) at the source of transistors M1 and M2. If the resulting signal (241) is positive, the gate of MNBIAS (354) will be pulled high causing the drain current of MNOUT (359) to increase. Conversely, if the resulting signal (241) is negative, the gate of MPBIAS (352) will be pulled low causing the drain current of MPOUT (358) to increase. The movement on the gates of MNBIAS (354) and MPBIAS (352) is related to the magnitude of resulting signal (241) into the sources of M1 and M2.

In one or more embodiments, MNCOPY (364) and/or MPCOPY (360), through the coupling via the bias lines (356, 362), directly mirror a replica of the resulting signal (241). The replica passes through MNCOPY (364) and/or MPCOPY (360). $I_{REF}$ (369) is selected to be greater than the maximum resulting signal (241) expected during normal operation, when little to no interference is present. Because $I_{REF}$ is much greater than the resulting signal (241), and therefore also greater than the replica through transistors MNCOPY (364) and/or MPCOPY (360), the drain of MNCOPY (364) will be pulled to the upper rail while the drain of MPCOPY (360) will be pulled to the lower rail. During normal operation, variations on the gates of MPOUT (358) and MNOUT (359) associated with the resulting signal (241) will be insufficient at increasing the gate-to-source voltage of MNCOPY (364) or MPCOPY (360) such that they pull away from their respective rails. Only when a large interference signal is present in the replica will the gates move enough to pull the drains of MNCOPY (364) and MPCOPY (360) to the opposite rails. This swing from one rail to the opposite rail causes the one or more inverters (367) to output the interference alert signal (251).

In one or more embodiments, if the current mirrors (372A, 3752B) remain active during an interference event, the outputs of the inverters (367) will continuously change state at the frequency of the interference signal. In one or more embodiments, the input device (200) includes switches (not shown) that disable the interference detection circuit (318) when an interference signal is detected or after a predetermined number of clock cycles of the interference signal being detected.

Figure 4:
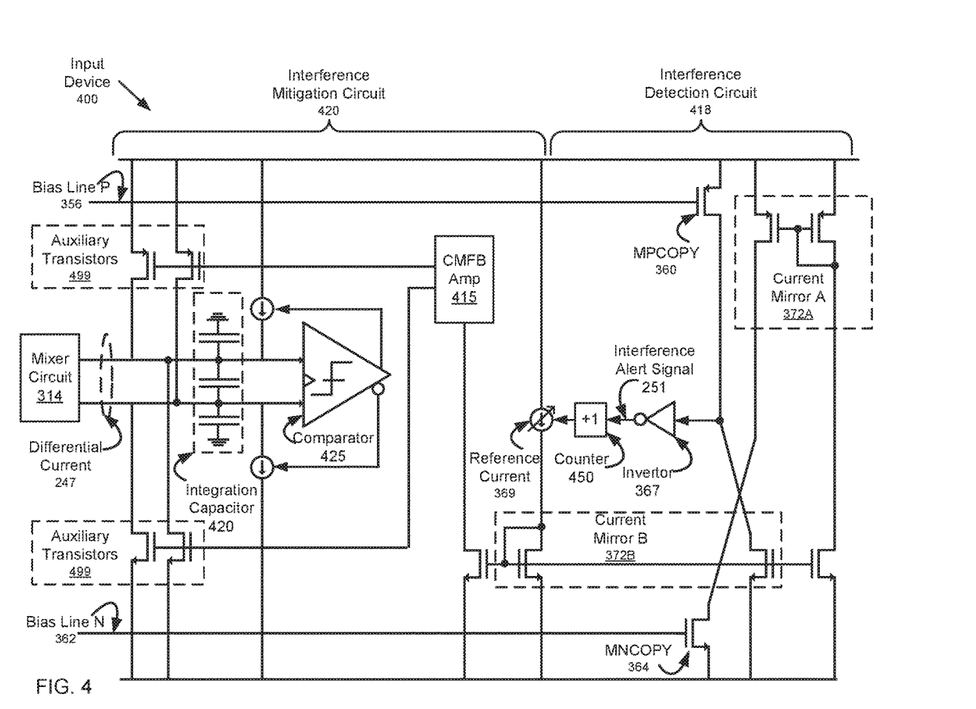
FIG. 4 shows circuit diagrams of an interference detection circuit and an interference mitigation circuit in accordance with one or more embodiments.

FIG. 4 shows an input device (400) in accordance with one or more embodiments. The input device (400) may correspond to input device (200), discussed above in reference to FIG. 2. As shown in FIG. 4, the input device (430) includes the bias lines (356, 362) (discussed above), the mixer circuit (314), an interference detection circuit (418), and an interference mitigation circuit (420). The interference detection circuit (418) and the interference mitigation circuit (420) may correspond to the interference detection circuit (218) and the interference mitigation circuit (220), discussed above in reference to FIG. 2.

In one or more embodiments, the interference detection circuit (418) is similar (i.e., has similar components, similar connections, and operates in a similar manner) to interference detection circuit (318), discussed above in reference to FIG. 3. However, the interference detection circuit (418) might or might not have fewer inverters (367) than the interference detection circuit (318). Further, the interference detection circuit (418) includes a counter (450) coupled to the output of the inverter (367). The counter (450) is incremented in response to the interference alert signal (251) from the inverter (367) and the counter (450) feeds into an adjustment register (not shown) of the reference current (369). Accordingly, the magnitude of the reference current (367) can be increased in response to the interference alert signal (251).

As shown in FIG. 4, the input device (400) includes a delta-sigma modulator implemented using at least an integration capacitor (420) and an clocked comparator (425) (e.g., a 1-bit quantizer). The input to the delta-sigma modulator is the differential current (247) from the mixer circuit (314). The delta-sigma modulator may be located within auxiliary component (216), which may be integrated with the interference mitigation circuit (420). Either output of the clocked comparator (425) may correspond to the output (249), discussed above in reference to FIG. 2.

In one or more embodiments, the interference mitigation circuit (420) includes auxiliary transistors (499) coupled to the integration capacitor (420). The interference mitigation circuit (420) also includes a common mode feedback (CMFB) amplifier (415) coupled to auxiliary transistors (499) and biased by the reference current (369). Although in FIG. 4 the interference detection circuit (418) that includes the counter (450), in other embodiments, the interference mitigation circuit (420) that includes the counter (450).

In one or more embodiments, when a large interference signal is present in the resulting signal (and thus the one or more replicas of the resulting signal), the current associated with the large interference signal may saturate the integration capacitor (420). This in turn will be reflected in the output of clocked comparator (425) and may result in undesirable behavior (e.g., incorrect determinations regarding the presence and/or position of an input object, determinations associated with fingerprint sensing, etc.).

In one or more embodiments, the CMFB Amplifier (415) and the auxiliary capacitors (499) are used to mitigate the effects of the interference signal on the differential current (247). Specifically, as long as the interference signal is larger than the reference current (369), the interference detection circuit (418) will continue to increase the reference current (369), which changes the bias of the CMFB Amp (415). Changing the bias of the CMFB Amp (415) changes the voltage applied to the gates of the auxiliary transistors (499), impacting the drains of the auxiliary transistors (499) and mitigating a voltage associated with the interference signal on the integration capacitor (420).

In one or more embodiments, the reference current (369) may be the common-mode current for the architecture of the input device (400). In general the common-mode current is used to maintain equal voltages on both inputs of the comparator (425). As discussed, the configuration shown in FIG. 4 enables real-time adjustment of the common-mode current. In one or more embodiments, if the common-mode current has been increased due to the presence of an interference signal, the common-mode current may be reduced one the interference signal is no longer present (e.g., the increased common-mode current is reduced at the end of a frame).

As an alternative, or in addition, to changing the reference current (369), the interference alert signal (251) may trigger the auxiliary component (216) or other processing components (e.g., digital filter) to ignore incoming samples. In order to prevent a false trigger which causes an accidental sample skip, a digital state machine may utilize the interference alert signal (251) as well as the toggling of the opposite side of the interference detection circuit (318) to count how long it has been since the interference signal was first detected. This count may be utilized by the auxiliary component (e.g., filter) to only skip samples once the interference has been present long enough to possibly saturate the integration capacitor (420) and thus corrupt the samples. Additionally, this method could be used while the common-mode current (i.e., reference current (369)) is being increased to work off disturbances caused by the interference signal.

Figure 5:
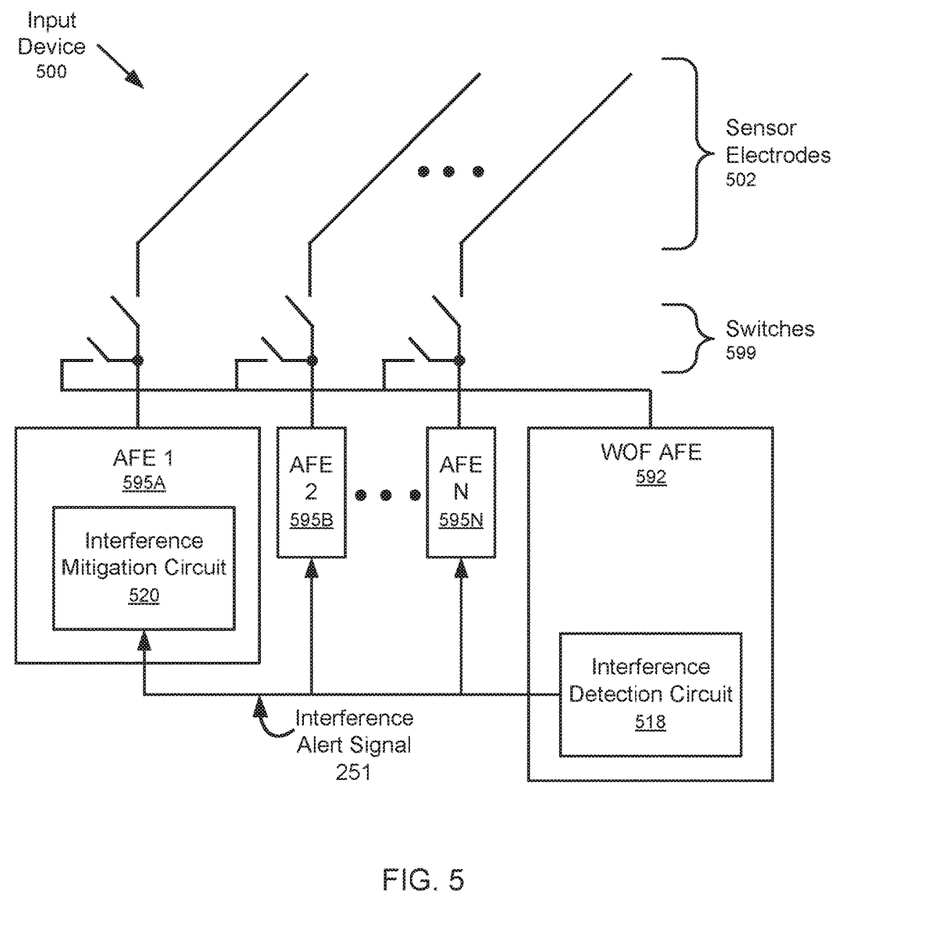
FIG. 5 shows a block diagram of an input device in accordance with one or more embodiments.

FIG. 5 shows an input device (500) in accordance with one or more embodiments. The input device (500) may correspond to any of input device (100), input device (200), input device (300), and/or input device (400). As shown in FIG. 5, the input device (500) includes multiple sensor electrodes (502) coupled to multiple touch analog front-ends (AFEs) (e.g., AFE 1 (595A), AFE 2 (595B), AFE N (595N)). The input device (500) also includes a Wake on Finger (WOF) AFE (592) and multiple switches (599) configured to mux any subset of the sensor electrodes (502) to the WOF AFE (592).

In one or more embodiments, the WOF AFE (592) is configured to detect a finger (or other input object) is proximate to the sensor electrodes (502). The touch AFEs (595A, 595B, 595N) are kept inactive until after the WOF AFE (592) detects the finger (or other input object) is proximate to the sensor electrodes (502). The touch AFEs (595A, 595B, 595N) may be activated to perform proximity sensing and/or fingerprint sensing.

As shown in FIG. 5, the WOF AFE (592) includes an interference detection circuit (518). The interference detection circuit (518) may correspond to interference detection circuit (218), interference detection circuit (318), or interference detection circuit (418), discussed above in reference to FIGS. 2-4, respectively. In one or more embodiments, only the WOF AFE (592) has the interference detection circuit (518). In such embodiments, the touch AFEs (595A, 595B, 595N) do not include an instantiation of the interference detection circuit (518).

Still referring to FIG. 5, touch AFE A (595A) includes an interference mitigation circuit (520). The interference mitigation circuit (520) may correspond to interference mitigation circuit (220) or interference mitigation circuit (420) discussed above in reference to FIG. 2 and FIG. 4, respectively. The remaining touch AFEs (595B, 595N) may have essentially the same components as AFE A (595A) (i.e., each touch AFE (595A, 595B, 595N) may have its own instantiation of an interference mitigation circuit). The output of the touch AFEs (595A, 595B, 595N) may be used to perform proximate sensing and/or fingerprint sensing.

Those skilled in the art, having the benefit of this detailed description, will appreciate that in the configuration of FIG. 5, it is the WOF AFE (492) that detects an interference signal (via interference detection circuit (518)) and it is each touch AFE (595A, 595B, 595N) that mitigates the interference signal for its own samples (e.g., via integration mitigation circuit (520)). The interference alert signal (251) is used to trigger each instantiation of the interference mitigation circuit.

In one or more embodiments, there are at least two noise bursts (time windows for observing an interference signal) that can be implemented with the configuration shown in FIG. 5. The first potential noise burst occurs after the WOF AFE (592) detects that a finger is down on the sensor electrodes (502). This noise burst is executed with the transmitters disabled in order to look for any interference signal that is present. Because the transmitters are disabled, smaller interference signals can be detected. The second potential noise burst occurs during the WOF burst (time window for observing a finger is down on the sensor electrodes (502)). Because this noise burst is concurrent with the WOF burst, the total frame time budget remains available.

In one or more embodiments, a single reference current may be routed to each touch AFE (595A, 595B, 595N). Each AFE (595A, 595B, 595NB) would include the current comparator portion of the interference detection circuit (418) which should have a negligible footprint compared to the rest of the AFE. By adding additional logic to the outputs of all the triggers (an OR gate, for example), any combination of RX electrodes could be monitored for interference events during a burst. This would require only a single bias voltage route as opposed to a reference current per AFE. In addition, if the common-mode current is used as the reference current, the bias line will already exist in the AFE which would reduce the footprint of this implementation even further.

Referring back to FIG. 2, in one or more embodiments, the interference mitigation circuit (220) is configured to detect a dominant frequency of the interference signal from the interference alert signal (251). Assuming the input device (200) has a bandwidth of $2*\Delta f$ and the transmitting signal (243) has a transmit frequency of $f_{TX}$, the input device (200) would be sensitive to any interference signals that fall within the frequency range of $n*f_{TX} \pm \Delta f$, where n is a natural number. If the transmitting signal (243) is a square-wave, all odd harmonics (odd values of 'n') will be mixed down to the passband of the system. The even harmonic sensitivity is a result of the nonlinearities associated with the current conveyor (212) which cause the interference at even order multiples of the fundamental of the sensing frequency to intermodulate with the wanted signal at the sensing frequency such that the product falls within the passband of the system. Specifically, for an interference at $f_{INT}$, the resulting intermodulation product will be at $f_{INT} \pm f_{TX}$ so if $f_{INT}=2*f_{TX}$, the intermodulation product occurs at $f_{TX}$ and will be mixed down to DC.

Now, understanding interference frequencies to which the input device (100) is sensitive, the frequency of the interference signal can be identified. Further, sensing and mixing frequencies (e.g., the frequency of the transmitting signal (243)) may be selected to move away from the frequency of the interference signal and ensure the interference signal has a frequency that is out-of-band. This may be executed additionally or alternatively to any other mitigation technique including the disclosed mitigation techniques.

Figure 6:
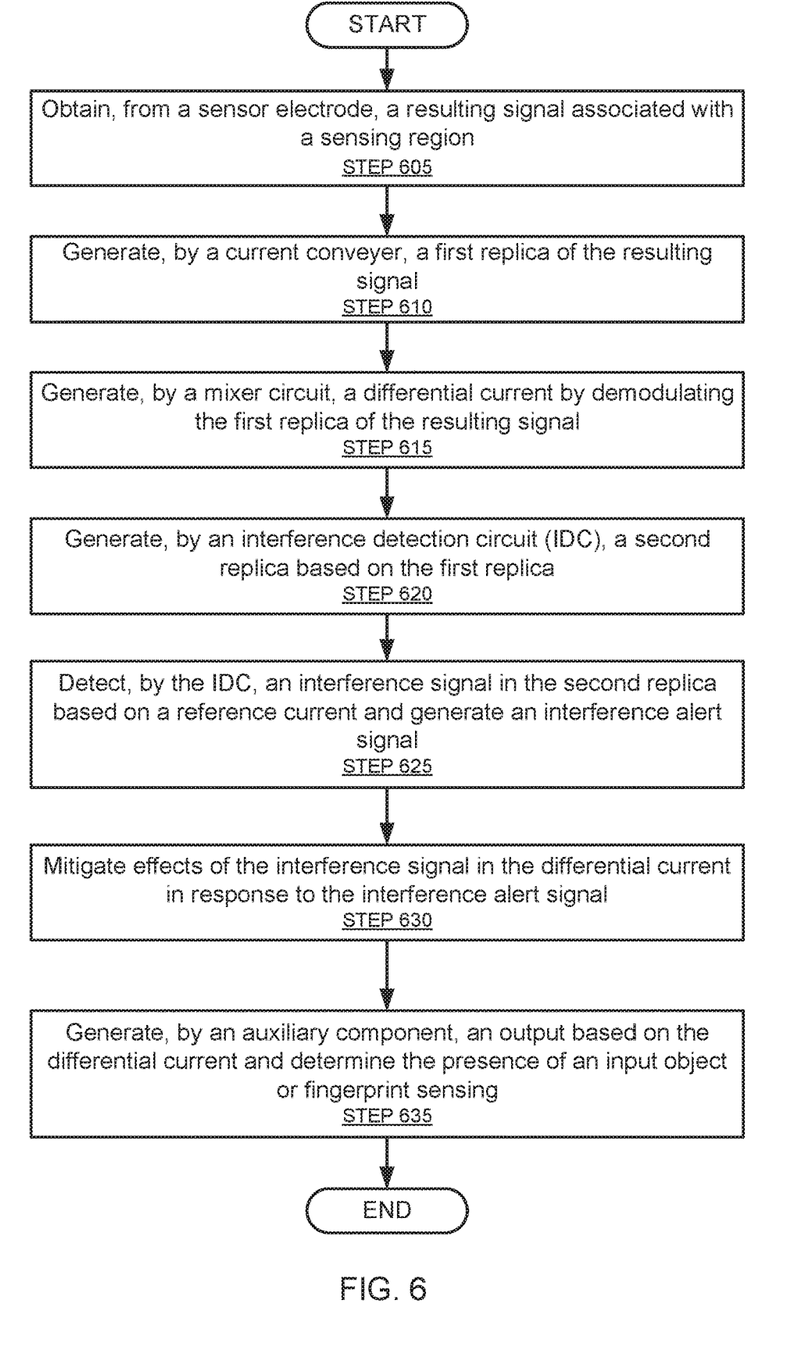
FIG. 6 shows a flowchart in accordance with one or more embodiments.

FIG. 6 shows a flowchart in accordance with one or more embodiments. The flowchart of FIG. 6 depicts a method for operating an input device associated with a sensing region. One or more of the steps in FIG. 6 may be performed by the components of the input device (200), discussed above in reference to FIG. 2. In one or more embodiments, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6.

Initially, a resulting signal is obtained from a capacitive sensor electrode associated with a sensing region (STEP 605). The resulting signal may be a function of one or more of: a transmitting signal, user input in the sensing region (if any), and/or interference from one or more sources.

In STEP 610, a first replica of the resulting signal is generated. The first replica may be an exact copy of the resulting signal or an approximation of the resulting signal. The first replica may be generated by a current conveyor including multiple transistors forming one or more current mirrors.

In STEP 615, a differential current is generated by demodulating (e.g., down-converting) the first replica signal. The differential current may be generated by a switch array. Demodulating effectively shifts the high-frequency content in the first replica signal down to a DC level. In one or more embodiments, the differential current is only pseudo-differential. In such embodiments, at any given time, there is only a pulse on one of the two lines that form the differential current.

In STEP 620, a second replica of the resulting signal is generated. This second replica is generated by an interference detection circuit (IDC) and is generated based on the first replica. Specifically, the IDC may utilize bias lines from the current conveyor and transistors to generate the second replica without affecting operation of the current conveyor.

In STEP 625, an interference signal is detected in the second replica by the IDC. This detection is executed using a reference current. Specifically, under normal operating conditions when little to no interference is present, current mirrors in the IDC that are biased using the reference current may keep the drains of one or more transistors at a voltage rail. As discussed above, the presence of a large interference signal (larger than the reference current) may force the voltage at the drains to pull away from the voltage rail to the opposite voltage rail. It is through this swing between the voltage rails that the interference signal is detected. An interference alert signal may be generated in response to detecting the interference signal. The interference alert signal may be generated by one or more inverters coupled to the drains of the transistors.

In STEP 630, effects of the interference on the differential current are mitigated in response to the interference alert signal. One or more techniques may be used to mitigate the effects of the interference (discussed above). For example, the transmitter frequency may be adjusted such that the interference frequency falls outside the passband of the input device. As another example, one or more components (e.g., digital filters) may skip samples in response to the interference alert signal. As yet another example, the reference current may be increased while it is smaller than the interference signal and this increased reference current may be used to mitigate voltage on an integrating capacitor associated with the interference.

In STEP 635, an output is generated based on the differential current, the interference alert signal, and one or more mitigation techniques (if any). The output is generated by an auxiliary component (e.g., an ADC, a filter, etc.). The presence of an input object and/or fingerprint may be determined from the output. Determining the presence of an input object and/or fingerprint in the sensing region may trigger the input device to execute one or more tasks and/or provide one or more reports.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device associated with a sensing region, comprising:
   a sensor electrode configured to receive a resulting signal associated with the sensing region;
   a current conveyor configured to generate a first replica of the resulting signal;
   a mixer circuit configured to generate a differential current by demodulating the first replica of the resulting signal;
   an interference detection circuit (IDC) configured to:
      generate a second replica of the resulting signal based on the first replica;
      determine the second replica comprises an interference signal based on a reference current; and
      generate an interference alert signal in response to determining the second replica comprises the interference signal; and
   an auxiliary component configured to generate an output based on the differential current and the interference alert signal.

2. The input device of claim 1, wherein the IDC comprises:
   a transistor coupled to a bias line in the current conveyor, wherein the second replica passes through the transistor;
   a current mirror based on the reference current, coupled to a drain of the transistor, and configured to set a voltage of the drain to a first voltage rail; and
   an inverter coupled to the drain of the transistor and configured to generate the interference alert signal in response to the voltage of the drain pulling away from the first voltage rail to a second voltage rail,
   wherein the voltage of the drain pulls away from the first voltage rail to the second voltage rail in response to the second replica comprising the interference signal exceeding the reference current.

3. The input device of claim 2, wherein the auxiliary component is configured to skip samples associated with the differential current in response to the interference alert signal.

4. The input device of claim 2, further comprising:
   a transmitter configured to drive a transmitter signal associated with the sensor electrode; and
   an interference mitigation circuit configured to:
      estimate a dominant frequency of the interference signal based on the interference alert signal; and
      mitigate the interference signal by adjusting a frequency of the transmitter signal away from the dominant frequency.

5. The input device of claim 2, further comprising:
   a first analog front-end (AFE) comprising the IDC and coupled to a plurality of sensor electrodes comprising the sensor electrode;
   a second AFE coupled to the sensor electrode and comprising the auxiliary component and an interference mitigation circuit; and
   a transmitter associated with the plurality of sensor electrodes.

6. The input device of claim 5, wherein the IDC is operated after a finger is detected touching the plurality of sensor electrodes, and wherein the transmitter is disabled while the interference detection circuit is operating.

7. The input device of claim 6, wherein the output of the auxiliary component is used in fingerprint sensing.

8. The input device of claim 2, further comprising:
   an interference mitigation circuit that increments the reference current in response to the interference alert signal.

9. The input device of claim 8, wherein:
   the auxiliary component comprises a delta sigma modulator comprising an integration capacitor;
   the interference mitigation circuit is configured to mitigate, using the reference current, a voltage on the integration capacitor associated with the interference signal; and
   the reference current is a common mode current.

10. A method for operating an input device associated with a sensing region, comprising:
    receiving, from a sensor electrode, a resulting signal associated with the sensing region;
    generating, by a current conveyor, a first replica of the resulting signal;
    generating, by a mixer circuit, a differential current by demodulating the first replica of the resulting signal;
    generating, by an interference detection circuit (IDC), a second replica of the resulting signal based on the first replica of the resulting signal;
    detecting, by the IDC, an interference signal in the second replica based on a reference current;
    generating, by the IDC, an interference alert signal in response to detecting an interference signal in the second replica; and
    generating, by an auxiliary component, an output based on the differential current and the interference alert signal.

11. The method of claim 10, wherein detecting the interference signal comprises:
    applying a bias line of the current converter to a transistor in the IDC, wherein the second replica passes through the transistor;
    setting, using a current mirror based on the reference current, a voltage of a drain of the transistor to a first voltage rail; and
    detecting, by an inverter coupled to the drain, the voltage of the drain pulling away from the first voltage rail to a second voltage rail,
    wherein the voltage of the drain pulls away from the first voltage rail to the second voltage rail in response to the second replica comprising the interference signal exceeding the reference current.

12. The method of claim 11, further comprising:
    mitigating, by an interference mitigation circuit, effects of the interference signal in response to the interference alert signal.

13. The method of claim 12, wherein mitigating effects of the interference signal comprises:
    mitigating a voltage on an integration capacitor associated with the interference signal by increasing the reference current,
    wherein the auxiliary component comprises a delta sigma modulator comprising the integration capacitor, and
    wherein the reference current is a common mode current.

14. The method of claim 12, wherein mitigating effects of the interference signal comprises:
    estimating a dominant frequency of the interference signal based on the interference alert signal; and
    mitigating the interference signal by adjusting a frequency of a transmitter signal associated with the sensor electrode away from the dominant frequency.

15. The method of claim 12, further comprising:
disabling a transmitter associated with the sensor electrode after a finger is detected touching the sensor electrode; and
operating the interference detection circuit while the transmitter is disabled,
wherein the interference detection circuit and the interference mitigation circuit are located in different analog front-ends (AFEs) of an input device.

16. An processing system for an input device associated with a sensing region, comprising:
sensor circuitry configured to:
drive a transmitting signal on to a transmitter electrode associated with the sensing region;
receive a resulting signal from a receiver electrode associated with the sensing region;
generate a first replica of the resulting signal;
generate a differential current by demodulating the first replica of the resulting signal;
generate a second replica of the resulting signal based on the first replica of the resulting signal;
detect an interference signal in the second replica based on a reference current;
generate an interference alert signal in response to detecting an interference signal in the second replica;
mitigate effects of the interference signal in the differential current based on the interference alert signal; and
generate an output based on the differential current after mitigating effects of the interference signal; and
determination circuitry configured to:
determine a presence of an input object in the sensing region based, at least in part, on the output.

17. The processing system of claim 16, wherein:
the first replica is generate by a current conveyor;
the second replica is generated by an interference detection circuit (IDC) comprising a transistor coupled to a bias line of the current conveyor; and
the IDC comprises:
a current mirror based on the reference current, coupled to a drain of the transistor, and configured to set a voltage of the drain to a first voltage rail; and
an inverter coupled to the drain of the transistor and configured to generate the interference alert signal in response to the voltage of the drain pulling away from the first voltage rail to a second voltage rail.

18. The processing system of claim 17, wherein:
the auxiliary component comprises a delta signal modulator comprising an integration capacitor;
mitigating effects of the interference signal comprises mitigating a voltage on the integration capacitor associated with the interference signal by increasing the reference current; and
the reference current is a common mode current.

19. The processing system of claim 17, wherein mitigating effects of the interference signal comprises:
estimating a dominant frequency of the interference signal based on the interference alert signal; and
adjusting a frequency of the transmitting signal away from the dominant frequency.

20. The processing system of claim 17, wherein the output is used for fingerprint sensing.

* * * * *